United States Patent [19]
Thompson

[11] Patent Number: 6,108,331
[45] Date of Patent: Aug. 22, 2000

[54] SINGLE MEDIUM WIRING SCHEME FOR MULTIPLE SIGNAL DISTRIBUTION IN BUILDING AND ACCESS PORT THEREFOR

[75] Inventor: William H. Thompson, Pittsford, N.Y.

[73] Assignee: Upstate Systems Tec, Inc., Victor, N.Y.

[21] Appl. No.: 09/114,021

[22] Filed: Jul. 10, 1998

[51] Int. Cl.[7] .............................. H04L 12/66; H04J 3/16; H04M 11/00; G06F 15/16
[52] U.S. Cl. ....................... 370/352; 370/389; 370/400; 370/466; 370/487; 348/7; 709/201
[58] Field of Search ..................... 370/395, 400, 370/401, 428, 389, 392, 465, 466, 471, 473, 474, 475, 486, 487, 490, 407, 406, 403, 352; 340/825.02, 825.03; 348/6, 7, 461, 467, 469; 455/3.1, 5.1; 359/115, 118, 120, 121; 709/201; 379/102.01

[56] References Cited

U.S. PATENT DOCUMENTS

| | | |
|---|---|---|
| 4,367,548 | 1/1983 | Cotten, Jr. et al. . |
| 4,763,317 | 8/1988 | Lehman et al. . |
| 4,768,186 | 8/1988 | Bodell . |
| 4,769,833 | 9/1988 | Farleigh et al. . |
| 4,775,971 | 10/1988 | Bergmann . |
| 4,845,702 | 7/1989 | Melindo . |
| 4,850,042 | 7/1989 | Petronio et al. . |
| 4,872,160 | 10/1989 | Hemmady et al. . |
| 5,041,963 | 8/1991 | Ebersole et al. ......................... 370/403 |
| 5,060,224 | 10/1991 | Konishi . |
| 5,077,727 | 12/1991 | Suzuki . |
| 5,103,447 | 4/1992 | Takiyasu et al. . |
| 5,127,067 | 6/1992 | Delcoco et al. . |
| 5,222,166 | 6/1993 | Weltha . |
| 5,271,000 | 12/1993 | Engerbersen et al. ................... 370/395 |
| 5,278,687 | 1/1994 | Jannson et al. . |
| 5,303,266 | 4/1994 | Budin et al. . |
| 5,305,350 | 4/1994 | Budin et al. . |
| 5,363,367 | 11/1994 | Kobayashi et al. . |
| 5,387,927 | 2/1995 | Look et al. .............................. 370/395 |
| 5,425,027 | 6/1995 | Baran . |
| 5,448,390 | 9/1995 | Tsuchiya et al. . |
| 5,500,794 | 3/1996 | Fujita et al. .............................. 379/102 |
| 5,506,964 | 4/1996 | Beukema . |
| 5,526,034 | 6/1996 | Hoarty et al. .............................. 348/7 |
| 5,528,582 | 6/1996 | Bodeep et al. . |
| 5,535,031 | 7/1996 | Cecchini . |
| 5,544,315 | 8/1996 | Lehfeldt et al. . |
| 5,548,635 | 8/1996 | Bradley et al. . |
| 5,550,818 | 8/1996 | Brackett et al. . |
| 5,594,726 | 1/1997 | Thompson et al. . |
| 5,600,469 | 2/1997 | Yamazaki . |

(List continued on next page.)

*Primary Examiner*—Alpus H. Hsu
*Assistant Examiner*—Afsar M. Qureshi
*Attorney, Agent, or Firm*—Eugene Stephens & Associates

[57] ABSTRACT

Intended primarily for use within a residential or commercial structure, an access node or access port has physical connectors for a variety of signal-receiving and -transmitting devices and includes apparatus that allow all of the signals used by the devices to be carried by as few as one or two conduits. The conduits can be fiber optic cables, coaxial cables, twister pair wiring, radio frequency broadcasts, or any other signal-carrying medium. The signals are converted to and from addressed data packets carried in a packet stream over the conduits. If the conduits are fiber optic cables or other non-conductor media, a media converter is included. A central node or node zero receives signals from outside the structure and converts them to addressed data packets, then sends the data packets over the conduit(s) as the packet stream. The access nodes take packets addressed to them and convert the packets back into the original signals, then feed the signals to appropriate connectors on the access nodes. The central node can also take packets from the access nodes and convert them into signals for transmission externally of the structure to, for example, service providers. Additionally, the central node can send packets from one access node to other access nodes for internode communication, allowing computer networking, remote use of devices connected to the access nodes, and configuration of the central node from devices connected to the access nodes.

59 Claims, 8 Drawing Sheets

U.S. PATENT DOCUMENTS

| | | |
|---|---|---|
| 5,610,916 | 3/1997 | Kostreski et al. . |
| 5,642,351 | 6/1997 | Baran . |
| 5,666,402 | 9/1997 | Griffin . |
| 5,684,799 | 11/1997 | Bigham et al. . |
| 5,717,795 | 2/1998 | Sharma et al. . |
| 5,729,548 | 3/1998 | Holender ................. 370/474 |
| 5,812,550 | 9/1998 | Sohn et al. ............... 370/395 |
| 5,892,604 | 4/1999 | Yamanaka et al. ....... 370/395 |
| 5,940,387 | 8/1999 | Humpleman ............. 370/466 |

SINGLE MEDIUM WIRING SCHEME FOR MULTIPLE SIGNAL DISTRIBUTION IN BUILDING AND ACCESS PORT THEREFOR

TECHNICAL FIELD

The invention relates to the field of digital signal distribution networks. The invention particularly relates to access ports for connecting devices to digital networks.

BACKGROUND OF THE INVENTION

Distribution of signals, such as those for telephone and cable television services, has long been handled by separate cabling within a building for each type of signal. When new signals are added, new cables must be wired, and the separate cabling scheme has been maintained even within newly constructed buildings. To reduce costs, the different cables are often bundled and brought to a single access point in a wall where they are connected to respective wall plates and connectors. Some are even connected to wall plates that hold all types of connectors needed for the cables in the bundle. However, running all that cabling from the signal source to each access point is quite expensive. Additionally, the cable bundles are large and hard to work with in the confined spaces available within walls. Further, the access points used with cable bundles require a significant amount of space to accommodate all the hardware to which the cables are attached. If the cables are kept separate, then there be many access points for respective services in a room requiring an excessive number of wall plates and holes for mounting the wall plates.

SUMMARY OF THE INVENTION

My invention utilizes a smart access port that allows the use of a single cable or a pair of cables to carry all types of signals one might wish to distribute within a building, though any number of cables and/or wires can be used. I can even use another medium, such as radio frequency transmission or infrared transmission, to carry the signals. The access port recognizes signals it receives through a stream of addressed data packets carried by the cable(s), wire(s), or other media. The signals carried by the packet stream are gathered at a central location (node zero or the central node) and are converted into addressed data packets. The addressed data packets are then sent as the packet stream to the access ports within the building. The data packets can additionally be allocated carrier signals at different frequencies according to their type of signal. Any suitable protocol can be used to address the data packets, including ATM, CEBus, and TCP/IP. The packet stream can be carried from node zero to a given access port over a single cable, a pair of cables, multiple wires and/or cables, or even a broadcast signal so that wiring and setup costs are greatly reduced.

Each access port preferably includes a main module that extends into a recess in a wall, floor, or ceiling of a building, similar to a standard receptacle box. The module can be mounted on a wall plate if the user so desires. One or more connectors, if appropriate, are carried on the main module so that devices may be connected to the system. Each access port also preferably has a data packet handling system in the main module that receives the packet stream, pulls packets for the port from the stream, converts each pulled packet into its original signal, and sends the packet to a connector of the access port to which a device capable of handling the signal is connected. The packet handling device can pull packets based on a location address, an address for a type of signal that the port can handle, an address for a particular device plugged into a particular access port, or any other suitable criteria.

A major advantage of my system is that it is transparent to the user. The user simply plugs a device into the appropriate connector on the wall plate and uses the device as usual. The access port and node zero worry about getting signals to and from the device. Further, my invention allows the use of any kind of device from computer network transceivers to Plain Old Telephone Service (POTS) devices as long as the appropriate signal translators and connectors are included at the access ports. Node zero can include an analog-to-digital (A/D) converter to translate analog signals, such as conventional telephone, cable television, and radio broadcast signals, into digital signals that can be readily broken into addressed data packets. There is no need for an A/D converter for digital services, such as ISDN, ADSL, digital television, and ethernet services. Where coaxial cable is used to carry the packet stream, the carrier signal frequencies can be allocated so that cable television signals can simply be passed through node zero to the individual wall plates without alteration or translation into data packets.

In addition to receiving packets from the packet stream, translating them into signals, and sending the signals to connectors, the access ports can send information back to node zero. For example, the access ports can inform node zero of what type of devices are plugged into the ports, a telephone can be picked up and dialed, and a VCR can be played at one port for play on a television connected to another port. Further, any computer on the network can configure the central node and control traffic on the network.

DESCRIPTION OF THE INVENTION

I use the term "addressed data packet" to refer to any discrete quantity of data bearing an address by which the data can be recognized as being sent to a particular destination. I use the term "packet stream" to refer to any series of addressed data packets such as can be carried on a fiber optic cable, a coaxial cable, twisted pair wire or cable, radio broadcast, infrared broadcast, or any other suitable medium.

Further, the term "comprising" is used in a non-limiting sense in that an item comprising an element is not required to include only that element, but can include additional elements as well.

Figure 1:
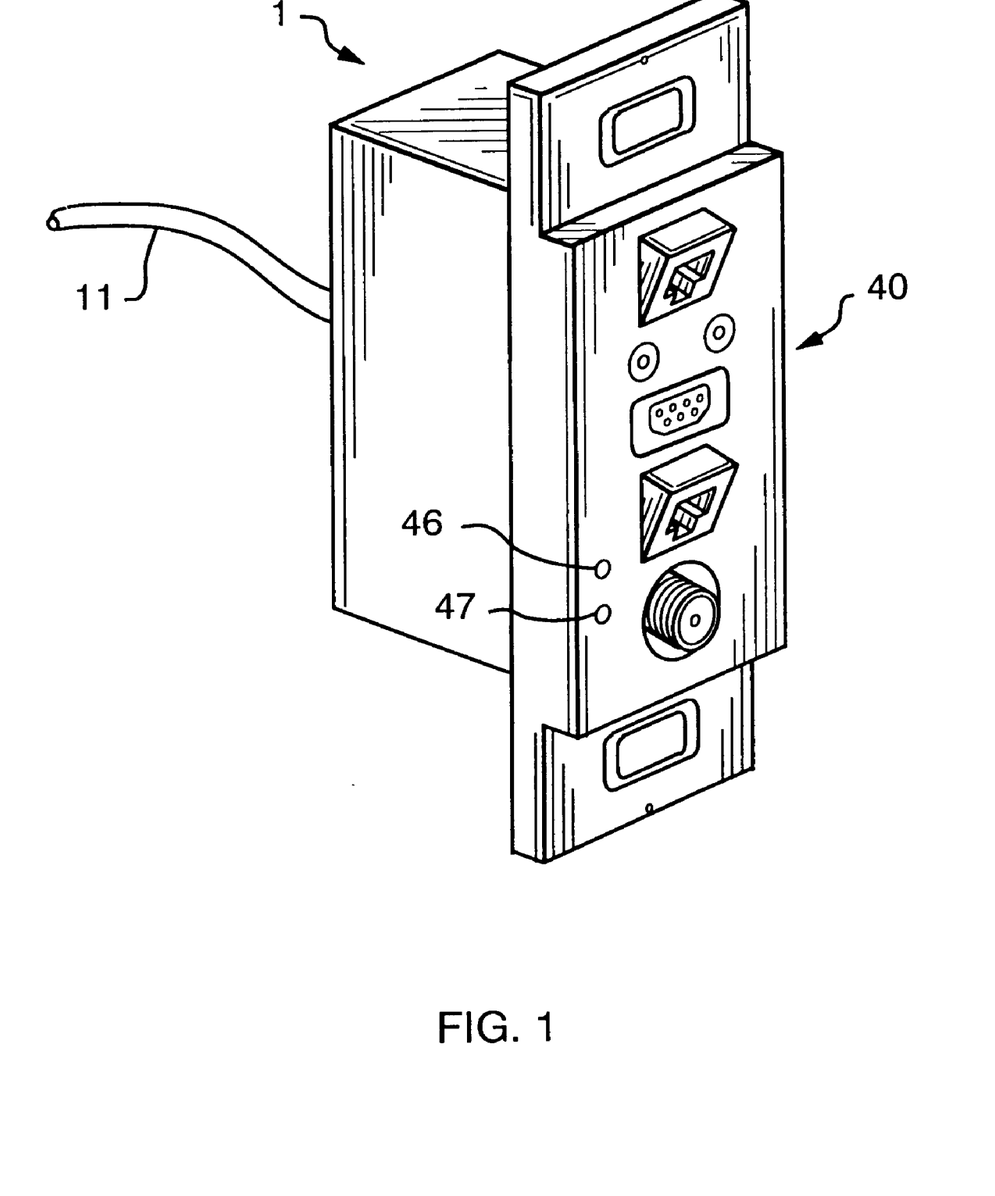
FIG. 1 is an isometric view of the access port of the invention configured for mounting in a wall receptacle box.
Figure 2:
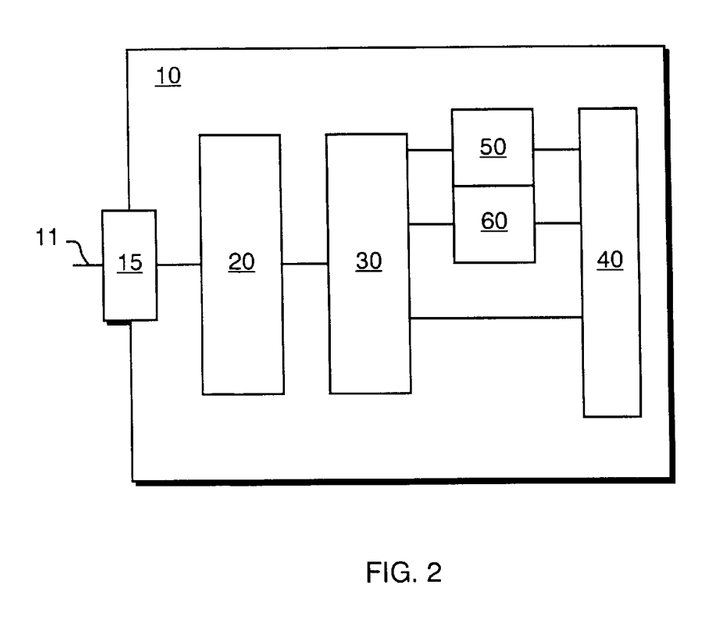
FIG. 2 is a schematic view of my access port as used with packet stream carrying media other than copper wiring.
Figure 3:
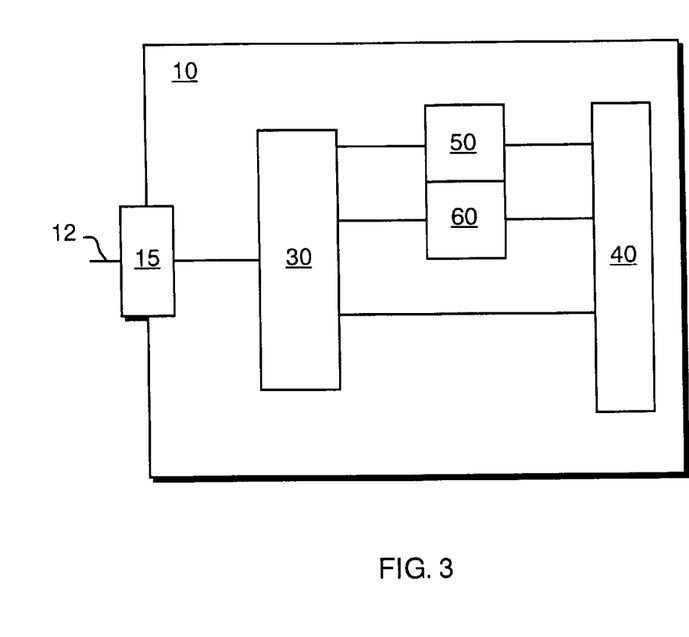
FIG. 3 is a schematic view of my access port as used with copper wiring.
Figure 4:
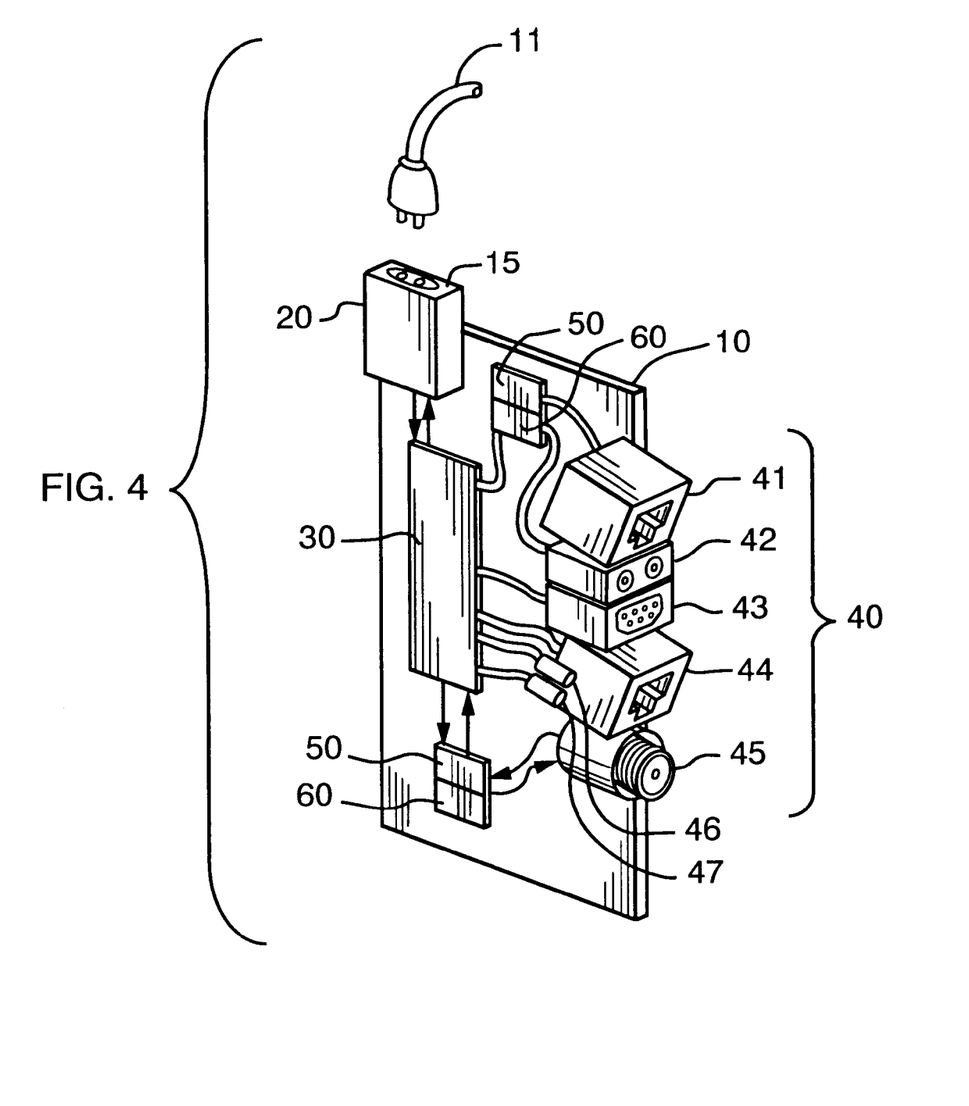
FIG. 4 is an isometric schematic view of my access port as schematically illustrated in FIG. 2.
Figure 5:
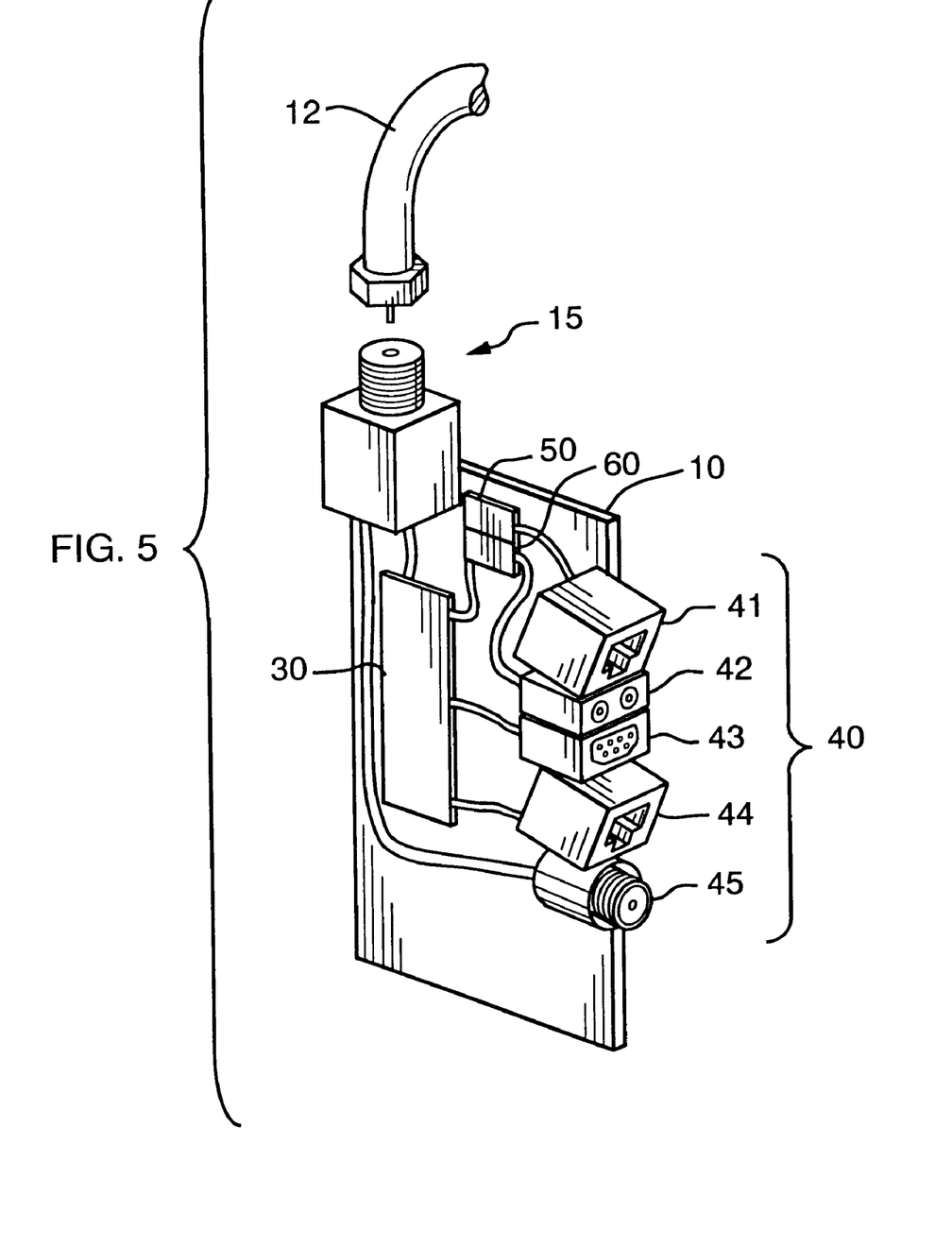
FIG. 5 is an isometric schematic view of my access port as schematically illustrated in FIG. 3.

My access port 1 preferably includes a main module 10 and can be configured to receive the packet stream over a suitable packet distributor or conveyor including one or more conduits, such as wiring, cabling, or even radio or other broadcast. Though I prefer to use fiber optic cable 11 or coaxial cable 12, twisted pair wiring or other acceptable conduits can also be used. While I prefer that the packet stream distributor or conveyor include a single conduit to each access port, two or more conduits can also be used if desired, which can facilitate two-way communications. The packet distributor or conveyor is connected to the main module 10 of my access port 1 via a main module connector 15 that is configured to receive the packet distributor or conveyor. Where the packet stream is carried over coaxial cable 12 or other copper wiring, I use a main module connector 15 configured to receive the conduit(s) of the packet stream conveyor or distributor, such as coaxial cable 12 or other copper wiring as seen in FIGS. 3 and 5. If there are plural conduits, a single main module connector 15 can be used or plural main module connectors can be used as appropriate. For example, the main module connector 15 can be both an input port and an output port when two-way communication is required, or two main module connectors 15 can be used with one for input and one for output.

Where the packet stream is carried by a medium other than copper wiring, I include a media converter 20 between the main module connector 15 and the main module 10 of my access port. The main module connector 15 can assume various forms for non-copper wiring. For example, the main module connector 15 can be an antenna for packet stream distributors or conveyors that include radio frequency broadcasts. The main module connector 15 can also be an optical conduit feeding from the packet stream distributor or conveyor to the media converter 20 when the packet stream distributor or conveyor includes a fiber optic cable. The media converter 20 is configured to convert the packet stream from whatever medium on which it is carried to a form that can be carried in electrical wiring. The media converter 20 then sends the packet stream on to a packet handling system 30, which picks packets addressed to the access port 1 from the packet stream and converts them back into their original signals. The signals are then sent directly to one of the physical medium connectors 40 or to a digital-to-analog (D/A) converter 50 and then to an appropriate one of the physical medium connectors. All connectors 40 for analog devices are connected to the D/A converter 50 and to an analog-to-digital (A/D) converter 60 to allow two-way communication through the connectors 40 and the port 10 by analog devices. I prefer to include status and activity indicators 46, 47 on the access port so that a user can easily determine these characteristics. Indicators for other characteristics can also be included, as well as separate indicators for each physical connector. I prefer to use light emitting diodes (LEDs) for the indicators.

Power to drive the circuitry of my access port 1 can be provided in a number of ways. For systems using copper cabling, power can be supplied over the same cable that carries the packet stream in much the same way that POTS lines provide power for current telephones. For systems using fiber optic cabling, a photoelectric cell could be included on the main module 10 to convert part of the optical signal to electricity for use by the circuitry of the access port 1. Alternatively, thin, flexible copper conductors disposed adjacent the fiber optic cable could provide the power required by the circuitry. Sources of power independent of the type of packet conveyor are also available. Long-life batteries, such as lithium cells, could be mounted on the main module 10. The access port 1 could also include or be connected to power supplies that would take house AC current and convert it to the type and voltage of electricity required by the circuitry of the access port 1.

Figure 11:
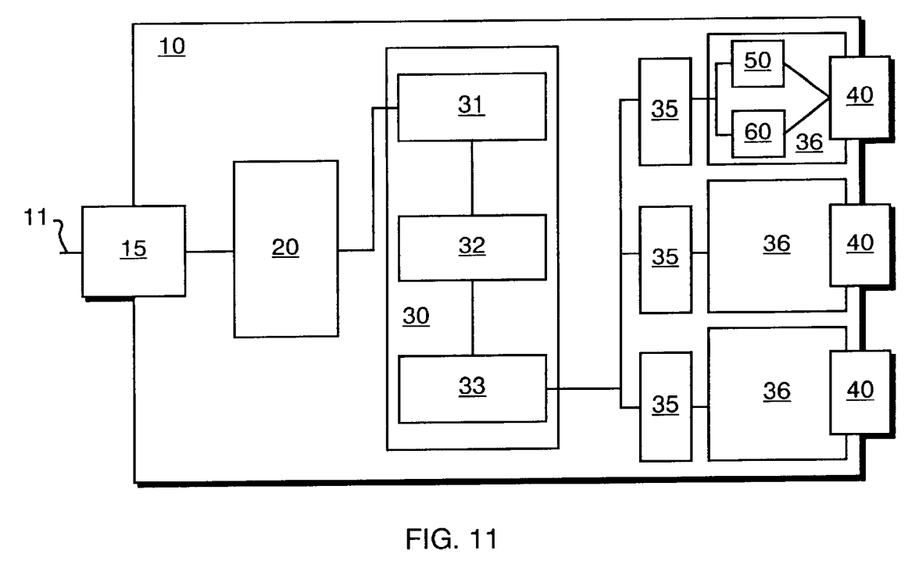
FIGS. 11 and 12 are schematic views of the access port of the invention showing variations in the locations of various components on the main module and on the expansion modules.
Figure 12:
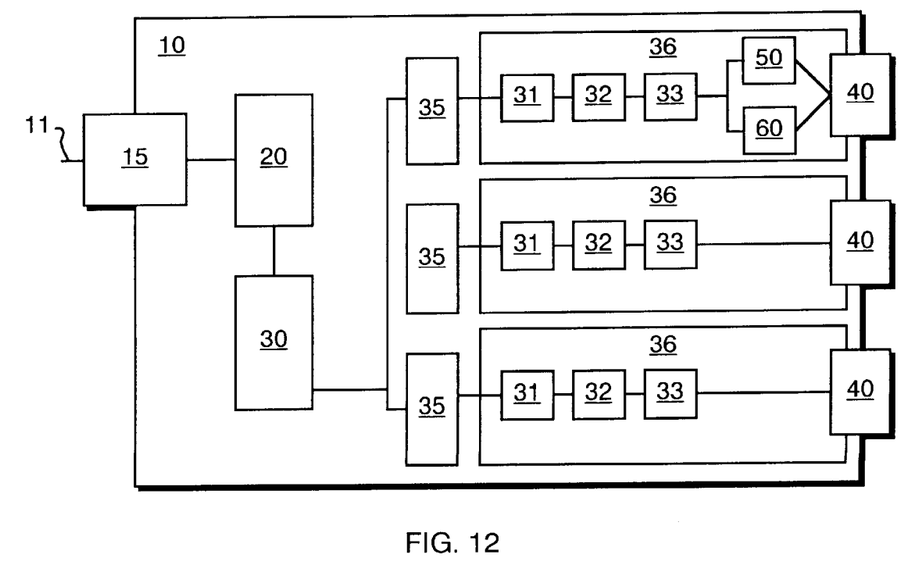

The circuitry of my access port 1 can all be on the main module 10 or can be modular. That is, each physical medium connector 40 can include connector- and signal-specific circuitry on its own expansion submodule 36 and be plugged into its own expansion connector 35 on the main module 10 of the access port 1 as seen particularly in FIGS. 11 and 12. The main module 10 in this case would include the main module connector 15, the media converter 20, if necessary, and basic parts of the packet handling system 30 that would at least distribute the packet stream to the expansion connectors 35. The packet handling system 30 could include additional components for further decoding of the packet stream, such as address filters 31, receivers 32, and converters/decoders 33, as seen, for example, in FIG. 11. Where such additional components are included on the main module 10, the packet handling system 30 can be arranged to translate packets from the packet stream into any format appropriate for a physical medium connector 40 that might be plugged into the expansion connectors 35 via expansion submodules 36. The main module 10 could additionally include a connector recognition system that recognizes what types of expansion submodules 36 are plugged into the main module 10 so that packets for the respective connectors 35 can be sent to their appropriate destinations. The packet handling system 30 need not have these additional components, but can act as a distributor of the packet stream to the expansion connectors, as seen in FIG. 12, for example. The expansion submodules 36 could then have additional packet handling circuitry, such as address filters 31, receivers 32, and converters/decoders 33, that would translate the packets into the original signal for the physical medium connector 40 on the expansion submodule 36. Where two-way communication is desired, the modules and/or submodules can include transmitters and encoders, or this functionality can be included in the receivers 32 and converters/decoders 33. The expansion submodules can also carry D/A and A/D converters if desired. Many, if not all, of these components can be software applications rather than actual hardware if so desired and appropriate.

Where a network configuration requires, the packet handling system 30 can be arranged to transmit an acknowledgment signal upon receipt of a packet at the access node 1. The acknowledgment signal can be a data packet addressed to the originator of the received packet or can take any other suitable form. In all configurations, the packet handling system 30 includes an address filter that allows packets addressed to the system's access port to pass further into the access port. The packet handling system 30 can also include a speed converter, a media converter where the physical medium connector to which a signal is directed is a fiber optic cable, and a cell disassembler to handle ATM data cells.

Figure 6:
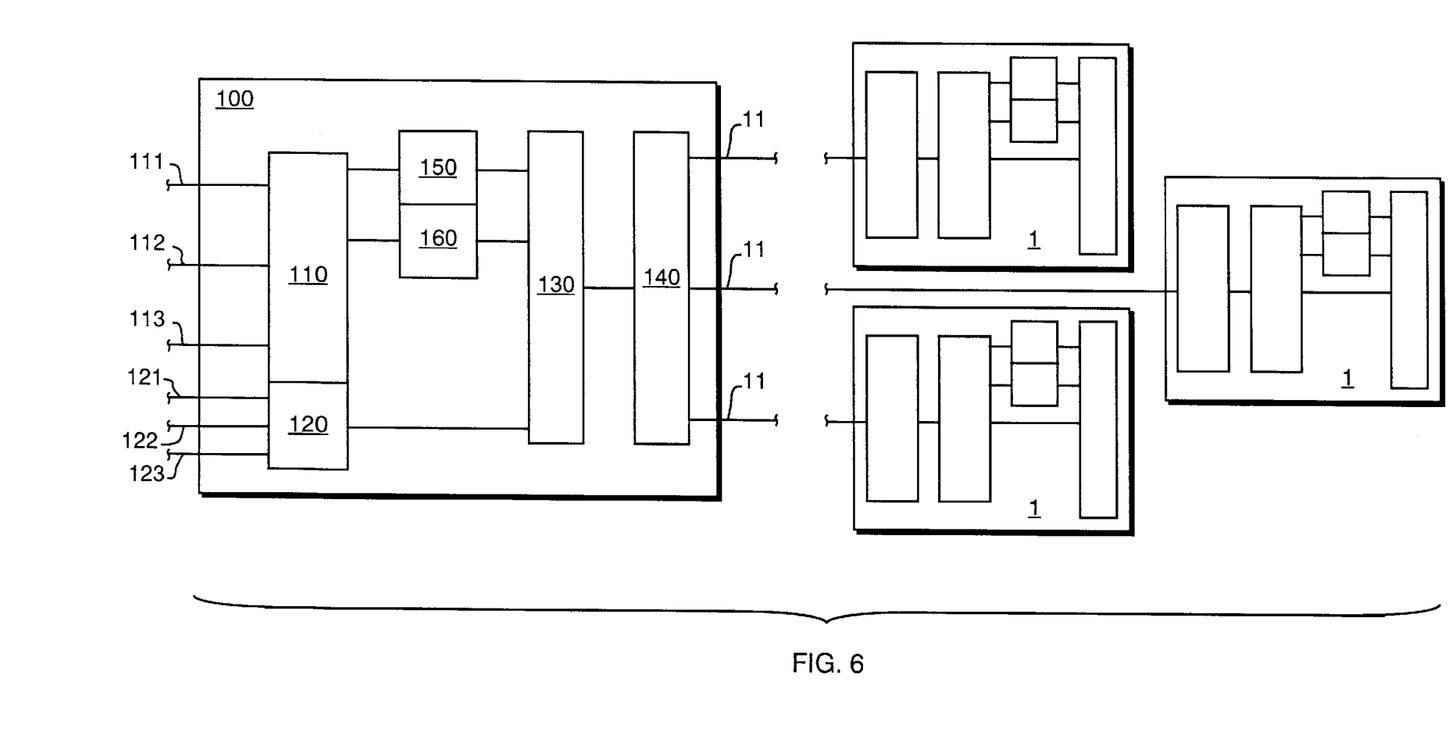
FIG. 6 is a schematic view of a digital network including my access port.
Figure 7:
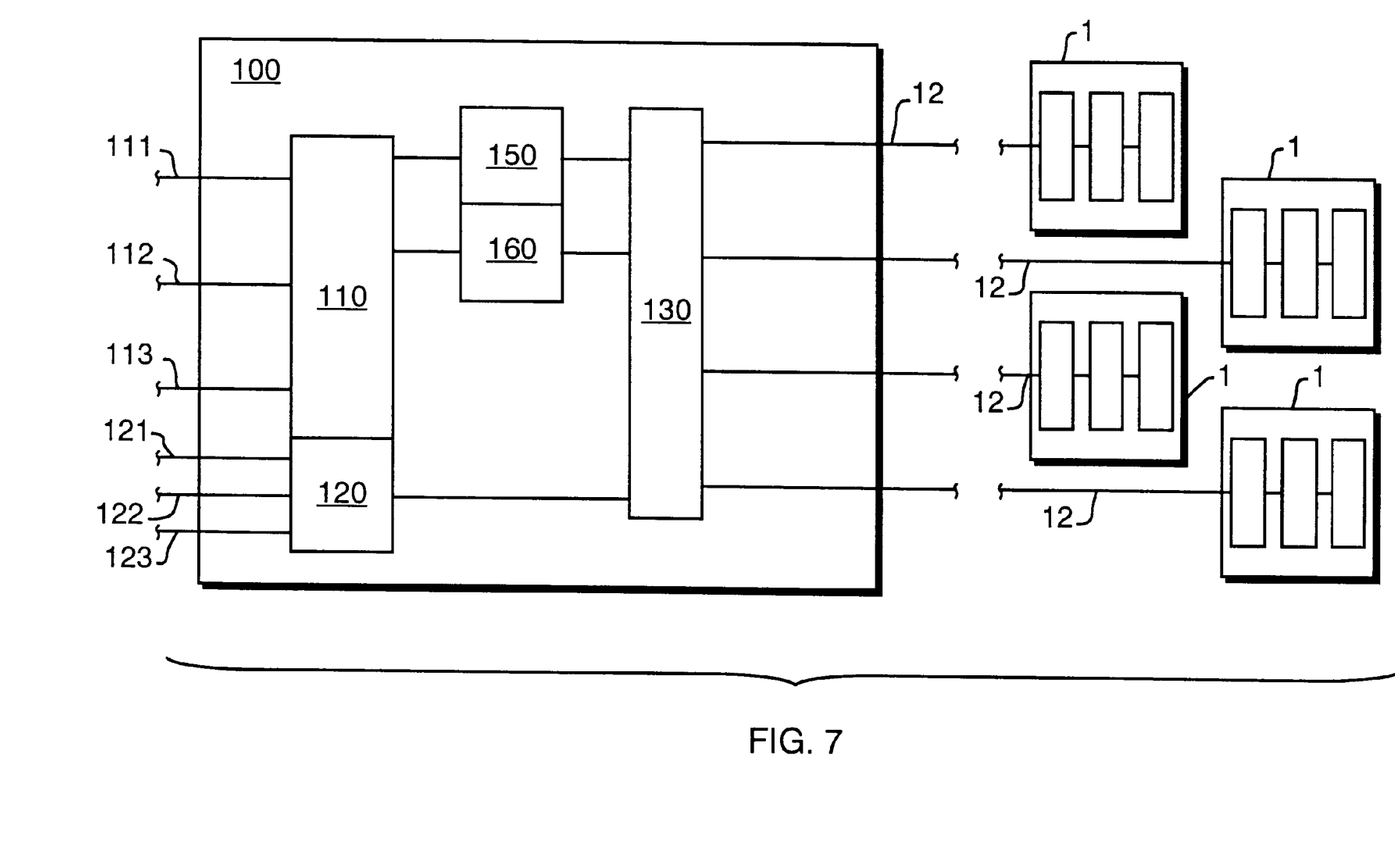
FIG. 7 is a schematic view of a digital network including my access port where the packet stream carrying medium is copper wiring.
Figure 8:
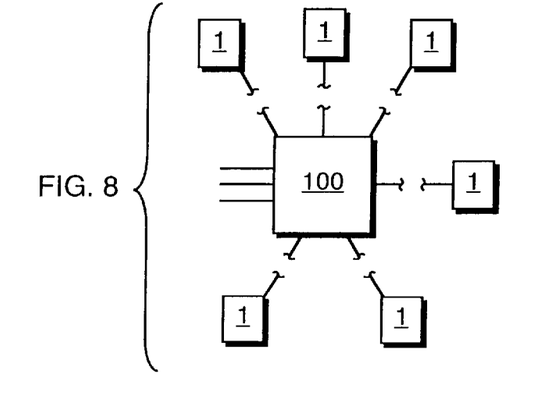
FIG. 8 is a schematic view of a digital network using my access port in a star topology.
Figure 9:
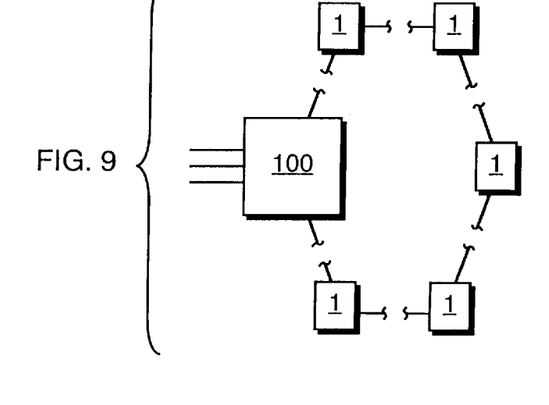
FIG. 9 is a schematic view of a digital network using my access port in a ring topology.
Figure 10:
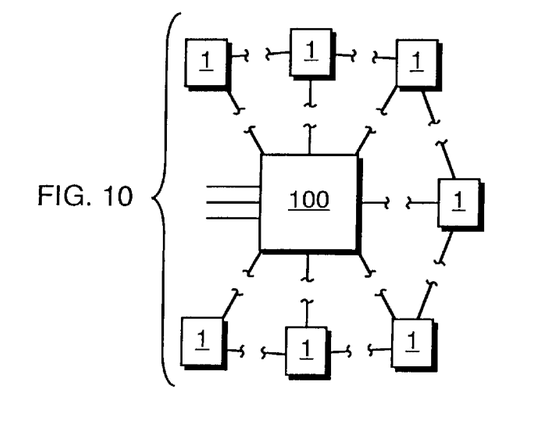
FIG. 10 is a schematic view of a digital network using my access port in a hybrid star/ring topology.

The packet stream received by my access port 10 is preferably generated by a central node or node zero 100, schematic examples of which are shown in FIGS. 6 and 7. Node zero 100 is a main input node that receives signals from outside the network via connectors 110, 120. Analog signals can enter node zero 100 through external analog signal connectors 110 and digital signals can enter node zero 100 through external digital signal connectors 120. The analog signals can include, but are not limited to, POTS 111, conventional broadcast television 112, and conventional cable television 113. Any other analog signal can also be received at node zero 100. The digital signals can include, but are not limited to, HDTV 121, computer network services 122, and digital CATV 123. All of the analog signals that must be are sent to an analog-to-digital converter 150 and then, along with the digital signals from the external digital connectors 120, are sent to a packet handling system 130. The packet handling system 130 can include address filters, converters, encoders, receivers, transmitters, and other such devices or software applications as are known in the art and are required to generate the packet stream. The packet stream is then sent to the access ports 1 via the packet stream distributor, such as coaxial cable 12. Where a non-conductor packet stream distributor is used, the central node 100 includes a media converter 140 that converts the electrical packet stream into an optical packet stream.

The central node 100 is also configured to receive data packets from the access ports 1. Thus, the media converter 140 also receives and converts the optical packet stream into an electrical packet stream that is sent to the packet handling system 130. The packet handling system 130 includes routers, address filters, converters, decoders, receivers, transmitters, and other such devices or software applications as are known in the art and are required to pick data packets addressed to the central node 100 from the packet stream and send them to their appropriate destinations. For example, a telephone could be connected to one of my access ports 1 that would send the telephone's outgoing signals to the central node 100 via addressed data packets that would be picked from the packet stream, decoded, and sent on to a telephone service provider such as the service provider from which POTS signal 111 comes.

My access ports 1 can be configured to allow connection of any signal-receiving and/or -transmitting device transparently so that all the user need do is use the device as he or she would with conventional wiring. A given access port can be configured to handle as many devices as desired, yet only requires a single cable to carry all the signals, via the packet stream, to and from node zero.

The preferred implementation of my invention is in combination with a central node or node zero in a residential or commercial structure. The structure would preferably have at least one access port in each room of the building and the central node or node zero in a closet or a basement. For newly constructed buildings, fiber optic or coaxial cable would preferably be run to each access port from the basement and the central node or node zero during construction, though other conduits could be used as discussed above. Retrofitting or installing in an existing structure is not as preferable, but is quite easy to achieve when fiber optic cable is used since the cable is small and flexible and can be run unobtrusively along baseboards or at the juncture of walls and floors to the access ports. Retrofitting with radio broadcast packet stream conveyors or distributors is also easy since no cables need to be installed.

In this preferred implementation, telephone, radio, television, and any other signals are fed into the node zero, which then converts the signals to addressed data packets and sends them to the access ports via the packet stream. The data packets can be addressed using unique access port addresses, unique device addresses, device type addresses, signal type addresses, or any other suitable addressing scheme so long as the access ports are configured to recognize and convert the addressed data packets correctly. Thus, TCP/IP, ATM, CEBus, or any other networking protocol can be used with my invention. Additionally, my invention can be used to enhance use of the devices connected to the network. For example, voice mail and other advanced features can be added to POTS by including appropriate modules in the central node or by applying software programming to the central node. For example, a programmable microprocessor can be included in the central node, and/or any personal computer connected to the network via an access port can communicate with the central node to control features of the network. Further, the two-way communication and addressing provided by my invention allows information from one access port to be broadcast to other access ports. This broadcast feature can be used to allow remote usage of devices on the network. For example, a VCR connected to one port could be used to play a program on a television connected to a port in another location, and the network could be configured to allow remote control signals to be sent to the VCR from the viewing location. Computers connected to the network can also communicate with each other, allowing remote control of a computer with another computer on the network, collaboration between computers/users, and other network activities, such as network gaming.

| Parts List |
| --- |
| 1 Access port; access node |
| 10 Main module |
| 11 Fiber optic cable |
| 12 Coaxial cable |
| 15 Main module connector |
| 20 Media converter |
| 30 Packet handling system |
| 31 Address filter |
| 32 Receiver |
| 33 Converter/decoder |
| 35 Expansion connector |
| 36 Submodule |
| 40 Physical medium connectors; device connectors |
| 41 RJ-45 connector |
| 42 RCA connectors |
| 43 Serial connector |
| 44 Ethernet connector |
| 45 Coaxial cable connector |
| 46 Status indicator |
| 47 Activity indicator |
| 50 Digital-to-Analog (D/A) converter |
| 60 Analog-to-Digital (A/D) converter |
| 100 Central node; node zero |
| 110 Connectors for external analog signals |
| 111 POTS signal |
| 112 Conventional (analog) broadcast television signal |
| 113 Conventional (analog) cable television signal |
| 120 Connectors for external digital signals |
| 121 High Density Television (digital) broadcast signal |
| 122 Computer network services signal |
| 123 Digital cable television signal |
| 130 Packet handling system |
| 140 Media converter (e.g. electrical to optical) |
| 150 Analog-to-digital converter |
| 160 Digital-to-analog converter |

What is claimed is:

1. An in-house signal distribution system including:
   a main input node mounted in a structure and taking at least one external signal and converting the at least one external signal to addressed data packets conveyed in a packet stream to at least one access node, each access node having a unique node address;
   each access node being an access port including a main module mounted in a wall of the structure and further including:

a main module connector connected to the packet stream;

at least one physical medium connector connected to the main module and arranged for connection to at least one device that can receive respective ones of the at least one signal distributed by the in-house signal distribution network;

a packet handler that picks packets addressed to the access node from the packet stream; and the packet handler converting the picked packets back to their respective ones of the at least one signal and sending the respective ones of the at least one signal to a respective physical medium connector of the access node; and a packet stream distributor carrying the packet stream from the main input node output port to each access node main module connector.

2. The system of claim 1 wherein the packet stream distributor includes a fiber optic cable and the main input node and the at least one access node include media converters, the media converters converting the packet stream from an electrical packet stream to an optical packet stream and vice versa.

3. The system of claim 1 wherein the packet stream distributor includes a coaxial cable.

4. The system of claim 1 wherein the main input node further includes a frequency allocator that transmits data packets over the packet stream distributor at particular frequencies according to the respective types of signals represented by the data packets.

5. The system of claim 4 wherein the access node packet handlers use the frequency at which a data packet is transmitted to determine what type of signal the data packet represents and to which connector the data packet should be sent after it is converted.

6. The system of claim 4 wherein the packet stream distributor includes coaxial cable, the main input node receives a cable television signal as one of the external signals, and the frequency allocator passes the cable television signal through to the coaxial cable unchanged.

7. The system of claim 6 wherein the frequency allocator transmits signals of types other than cable television at frequencies outside a frequency range occupied by the cable television signal.

8. The system of claim 1 wherein each access node is directly connected to the main input node so that the system has a star topology.

9. The system of claim 1 wherein each access node is connected to other access nodes and the main input node in a ring topology.

10. The system of claim 1 wherein each access node is connected to the main input node and other access nodes in both a star and a ring topology.

11. The system of claim 1 wherein the packet handler includes:

an address filter that picks the packets addressed to the access node from the packet stream;

a receiver that receives the addressed packets; and a first converter arranged to take extracted packets and convert them to the respective one of the at least one signal.

12. The system of claim 1 wherein the main node receives signals from one access node addressed to another access node on the network, thereby allowing communication between devices attached to the one and another access nodes.

13. The system of claim 1 wherein the main input node receives signals from the access nodes informing the main input node of types of devices handled by the access nodes.

14. The system of claim 1 wherein the main input node receives signals from the access nodes informing the main input node that devices are plugged into the physical medium connectors.

15. A packet stream decoding access node being an access port of an in-house digital network and including apparatus that receives addressed data packets from a packet stream carried by a packet stream distributor and converts the addressed data packets into signals usable by devices connected to physical medium connectors of the access node, the apparatus of the access node further including:

a main module connector of the access node mounted on a main module of the access node and arranged to receive the packet stream from the packet stream distributor, an installed physical medium connector being connected to the main module and arranged for connection to a respective device that can receive a respective one of the signals distributed by the in-house digital network as a respective portion of the packet stream; and a packet handling system connected to the main module connector that extracts from the packet stream data packets addressed to one of the access node and a device connected to the access node, the packet handling system including a decoder that decodes the extracted data packets into a signal and sends the signal to a physical medium connector connected to the main module.

16. The access node of claim 15 wherein:

the main module includes an expansion connector into which a submodule can be inserted, the expansion connector sending the packet stream to the submodule;

the packet handling system, the decoder, and the physical medium connector are on the submodule; and the decoder decodes the extracted packets into a signal appropriate for a device connectable to the submodule via the physical medium connector.

17. The access node of claim 15 wherein:

the main module includes an expansion connector into which a submodule can be inserted, the expansion connector sending the extracted data packets to the submodule;

the decoder and the physical medium connector are on the submodule; and the decoder decodes the extracted packets into a signal appropriate for a device connectable to the submodule via the physical medium connector.

18. The access node of claim 15 wherein:

the main module includes an expansion connector into which a submodule can be inserted;

the packet handling system is on the main module and extracts packets appropriate for a predetermined set of devices connectable to the access node via the submodule;

the decoder is on the main module and decodes the extracted data packets into signals appropriate for the predetermined set of devices; and the submodule includes the physical medium connector so that the physical medium connector receives the signals when the submodule is plugged into the expansion connector.

19. The access node of claim 15 wherein the packet handling system sends an acknowledgment signal via the packet stream distributor when an addressed data packet has been successfully extracted from the packet stream.

20. The access node of claim 15 wherein the packet stream distributor is a single conduit to at least the access node.

21. The access node of claim 20 wherein the access node apparatus is arranged for two-way communication with the packet stream.

22. The access node of claim 15 wherein the packet stream distributor is a plurality of conduits to at least the access node and the main module connector of the access node is configured to receive all of the conduits.

23. The access node of claim 15 wherein the packet stream is generated by a central node, the central node being arranged to receive analog and digital signals and including:
   an analog-to-digital converter arranged to convert received analog signals to digital versions of the analog signals; and
   a router arranged to receive the digital signals and the digital versions of the analog signals, combine them into addressed data packets carried by a single digital signal, and send the single digital signal to the packet stream distributor via an output port.

24. The access node of claim 23 wherein the access node is one of a plurality of access nodes connected to the central node, each access node has a unique address, and the respective packet handling system of each access node extracts packets bearing the unique address of the access node.

25. The access node of claim 23 wherein the main module connector is configured to allow two-way communication between the access node and the packet stream, thereby allowing two-way communication between a device connected to the access node and one of the central node and a device connected to another access node connected to the packet stream.

26. In an in-house signal distribution system, an access node of the in-house signal distribution system that is an access port of the in-house signal distribution system and includes:
   a main module mounted in a communications box of a structure in which the in-house signal distribution system is installed;
   a main module connector mounted on the main module and connected to a packet stream of the in-house signal distribution system, the packet stream including addressed data packets that carry respective portions of at least one signal distributed by the in-house signal distribution network;
   at least one physical medium connector connected to the main module and arranged for connection to at least one device that can receive respective ones of the at least one signal distributed by the in-house distribution network;
   a packet handler that picks packets for the access node from the packet stream;
   the packet handler converting the picked packets back to their respective ones of the at least one signal and sending the respective ones of the at least one signal to a respective physical medium connector of the access node; and
   a packet stream distributor carrying the packet stream to the access node main module connector.

27. The access node of claim 26 wherein the packet stream is generated by a main input node that takes at least one external signal and converts the at least one external signal to addressed data packets carried by the packet stream to the access node, the at least one external signal being at least one signal for distribution.

28. The access node of claim 27 wherein the packet stream distributor includes a fiber optic cable and the main input node and the access node include media converters, the media converters converting the packet stream from an electrical packet stream to an optical packet stream and vice versa.

29. The access node of claim 27 wherein the main input node further includes a frequency allocator that transmits data packets over the packet stream distributor at particular frequencies according to the respective types of signals represented by the data packets.

30. The access node of claim 29 wherein the packet stream distributor includes coaxial cable, the main input node receives a cable television signal as one of the external signals, and the frequency allocator passes the cable television signal through to the coaxial cable unchanged.

31. The access node of claim 30 wherein the frequency allocator transmits signals of types other than cable television at frequencies outside a frequency range occupied by the cable television signal.

32. The access node of claim 27 wherein the main input node receives signals from the access node informing the main input node of types of devices handled by the access node.

33. The access node of claim 27 wherein the main input node receives signals from the access node informing the main input node that devices are plugged into the physical medium connectors.

34. The access node of claim 27 wherein a plurality of access nodes are connected to the in-house signal distribution system and the main input node receives signals in the form of addressed data packets from one access node addressed to another access node on the in-house signal distribution system, thereby allowing communication between devices attached to the one and another access nodes.

35. The access node of claim 27 wherein the main input node is configurable by a computer connected to the access node.

36. The access node of claim 26 wherein the packet stream distributor includes a fiber optic cable and the access node includes a media converter, the media converter converting the packet stream from an electrical packet stream to an optical packet stream and vice versa.

37. The access node of claim 26 wherein the packet stream distributor includes a coaxial cable.

38. The access node of claim 26 wherein the access node packet handler uses a frequency at which a data packet is transmitted to determine what type of signal the data packet represents and to which physical medium connector the data packet should be sent after it is converted.

39. The access node of claim 26 wherein a plurality of access nodes are each directly connected to the in-house signal distribution system so that the system has a star topology.

40. The access node of claim 26 wherein a plurality of access nodes are each connected to other access nodes and the in-house signal distribution system so that the system has a ring topology.

41. The access node of claim 26 wherein a plurality of access nodes are each connected to other access nodes and the in-house signal distribution system so that the system has both a star and a ring topology.

42. The access node of claim 26 wherein the packet handler includes:
   an address filter that picks packets addressed to one of the access node and a device connected to the access node from the packet stream;

a receiver that receives the addressed packets; and a first converter arranged to take extracted packets and convert them to the respective one of the at least one signal.

43. The access node of claim 26 wherein the access node is arranged to send internal signal data packets addressed to another access node on the in-house signal distribution system, the internal signal data packets carrying portions of at least one internal signal sent by at least one device connected to the access node and usable by a device connected to the another access node, thereby allowing communication between devices attached to the access nodes.

44. In an access port mounted in a communications box recessed within a wall, the access port being an access node of an in-house signal distribution network and including:

an electronic device mounted on a main module and including a packet handler receiving a packet stream that includes addressed data packets, the packet handler taking from the packet stream data packets addressed to the access node;

a first converter of the electronic device in communication with the packet handler that discerns what type of signal each data packet represents, converts the data packet to its signal type, and sends the signal to a connector arranged to receive the signal; and the connector being supported on the main module with one end being accessible from within the communications box for connection to the electronic device and another end being accessible from without the communications box for connection to an external device by a user.

45. The access port of claim 44 wherein the connector protrudes through a wall plate mounted across an open end of the communications box.

46. The access port of claim 44 wherein the first converter uses a frequency at which the data packet is received to determine what type of signal the data packet represents.

47. The access port of claim 44 wherein the first converter uses information in a packet header to determine what type of signal the data packet represents.

48. The access port of claim 44 further including:

a second converter in communication with the connector, the second connector receiving a signal from the connector and converting the signal to addressed data packets that are sent to the packet handler; and the packet handler receiving addressed data packets from the second converter and sending the data packets into the packet stream.

49. The access port of claim 44 wherein the packet stream is carried over a fiber optic cable connected to a media converter of the access port, the media converter also being connected to the electronic device and taking the packet stream in photonic form and converting it to an electronic form usable by the electronic device.

50. The access port of claim 44 wherein the packet stream is carried over a coaxial cable connected to the electronic device.

51. The access port of claim 44 wherein the packet stream is carried over a plurality of conduits to the electronic device.

52. The access port of claim 44 wherein a plurality of access ports are connected to the packet stream, each access port having its unique network address, the packet stream being provided by a central node that receives external signals, converts them into addressed data packets, and sends them into the packet stream.

53. The access port of claim 52 wherein the central node also receives signals from the access ports.

54. The access port of claim 53 wherein the signals from the access ports inform the central node what types of signals each access port is arranged to receive.

55. The access port of claim 53 wherein the signals from the access ports inform the central node whether a device is plugged into the connector.

56. The access port of claim 44 wherein the connector is for an analog signal and the first converter further includes a digital-to-analog converter.

57. The access port of claim 56 wherein the analog signal is a telephone signal.

58. The access port of claim 44 wherein the access node has a unique network address and the packet handler takes packets bearing the unique network address from the packet stream.

59. A packet stream decoding access node being an access port of an in-house digital network and including apparatus that receives addressed data packets from a packet stream carried by a packet stream distributor and converts the addressed data packets into signals usable by devices connected to physical medium connectors of the access node, the apparatus of the access node further including:

a main module connector of the access node mounted on a main module of the access node and arranged to receive the packet stream from the packet stream distributor;

a packet handling system connected to the main module connector that extracts from the packet stream data packets addressed to one of the access node and a device connected to the access node, the packet handling system including a decoder that decodes the extracted data packets into a signal and sends the signal to a physical medium connector connected to the main module; and wherein the packet handling system sends an acknowledgment signal via the packet stream distributor when an addressed data packet has been successfully extracted from the packet stream.

* * * * *